United States Patent
Zhang et al.

(10) Patent No.: US 12,089,074 B2
(45) Date of Patent: *Sep. 10, 2024

(54) METHOD AND APPARATUS FOR REPORTING MASTER CELL GROUP FAILURE

(71) Applicant: ZTE Corporation, Guangdong (CN)

(72) Inventors: Mengjie Zhang, Shenzhen (CN); He Huang, Shenzhen (CN); Jianxun Ai, Shenzhen (CN); Jing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,975

(22) Filed: Sep. 11, 2023

(65) Prior Publication Data
US 2023/0422061 A1 Dec. 28, 2023

Related U.S. Application Data

(63) Continuation of application No. 17/383,135, filed on Jul. 22, 2021, now Pat. No. 11,785,483, which is a (Continued)

(51) Int. Cl.
*H04W 24/04* (2009.01)
*H04W 24/10* (2009.01)
(Continued)

(52) U.S. Cl.
CPC .......... *H04W 24/04* (2013.01); *H04W 24/10* (2013.01); *H04W 36/0058* (2018.08); (Continued)

(58) Field of Classification Search
CPC . H04W 24/04; H04W 24/10; H04W 36/0058; H04W 36/0069; H04W 36/0079; (Continued)

(56) References Cited

U.S. PATENT DOCUMENTS 10,313,934 B2    6/2019  Wu
11,165,632 B2 *  11/2021  Lee ................... H04W 74/0833
(Continued)

FOREIGN PATENT DOCUMENTS

CN    107690154 A    2/2018
CN    107690162 A    2/2018
(Continued)

OTHER PUBLICATIONS

International Search Report for priority application No. PCT/CN2019/073186, dated Dec. 17, 2019, 3p, in English language.
(Continued)

*Primary Examiner* — Robert J Lopata
(74) *Attorney, Agent, or Firm* — Crowell & Moring LLP

(57) ABSTRACT

A method and apparatus for reporting a master cell group (MCG) failure and/or a Primary Cell (PCell) failure when the MCG failure and/or the PCell failure is detected by a wireless communication device is disclosed. In one embodiment, a method for reporting a Master Cell Group (MCG) failure by a wireless communication device, includes: detecting a first MCG failure; and reporting the first MCG failure to a first wireless communication node, according to at least one of the following: a first indicator, a first failure type of the first MCG failure, a status of a Secondary Cell Group (SCG), and a Signal Radio Bearer (SRB) configuration.

25 Claims, 3 Drawing Sheets

Related U.S. Application Data continuation of application No. PCT/CN2019/073186, filed on Jan. 25, 2019.

(51) Int. Cl.
| | | |
|---|---|---|
| *H04W 36/00* | (2009.01) | |
| *H04W 76/19* | (2018.01) | |
| *H04W 88/06* | (2009.01) | |

(52) U.S. Cl.
CPC ..... *H04W 36/00692* (2023.05); *H04W 76/19* (2018.02); *H04W 36/0079* (2018.08); *H04W 88/06* (2013.01)

(58) Field of Classification Search
CPC ... H04W 36/305; H04W 76/15; H04W 76/19; H04W 88/06
USPC .......................................................... 370/329
See application file for complete search history.

(56) References Cited

U.S. PATENT DOCUMENTS

| | | | |
|---|---|---|---|
| 2019/0182883 A1 | 6/2019 | He et al. | |
| 2019/0313273 A1* | 10/2019 | Sharma | H04W 8/08 |
| 2020/0008113 A1* | 1/2020 | Chen | H04W 36/0038 |
| 2020/0059395 A1* | 2/2020 | Chen | H04W 28/082 |
| 2020/0221495 A1* | 7/2020 | Chen | H04W 74/0808 |
| 2020/0260518 A1* | 8/2020 | Orsino | H04W 76/19 |
| 2020/0323009 A1 | 10/2020 | Jiang | |
| 2021/0068000 A1* | 3/2021 | Tao | H04B 17/318 |
| 2021/0112617 A1* | 4/2021 | Zhang | H04W 76/15 |
| 2021/0127447 A1* | 4/2021 | Zhang | H04W 80/02 |
| 2021/0153281 A1* | 5/2021 | Deogun | H04W 76/16 |
| 2021/0168690 A1* | 6/2021 | Zheng | H04W 36/305 |
| 2021/0168889 A1* | 6/2021 | Kimba Dit Adamou | H04W 76/15 |
| 2021/0044344 A1 | 11/2021 | Jiang | |
| 2021/0385897 A1* | 12/2021 | Purkayastha | H04W 76/18 |
| 2022/0007257 A1* | 1/2022 | Wang | H04W 24/10 |
| 2022/0256368 A1* | 8/2022 | Futaki | H04W 24/04 |

FOREIGN PATENT DOCUMENTS

| | | |
|---|---|---|
| CN | 108401539 A | 8/2018 |
| CN | 108513737 A | 9/2018 |
| EP | 3331192 A1 | 6/2018 |
| SG | 11202104007 P | 4/2021 |
| WO | WO 2018/125872 A1 | 7/2018 |

OTHER PUBLICATIONS

Written Opinion of the International Searching Authority for priority application No. PCT/CN2019/073186, dated Oct. 15, 2019, 3p, in English language.

Rapporteur Ericsson, "UE Conformance Test Aspects—Dual connectivity for LTE (Rel-12) Work Plan", 3GPP TSG-RAN WG5 meeting #69 R5-155218, Nov. 20, 2015, Chapters 1-4.

Extended European Search Report for application No. EP 19912170.8 dated Jul. 28, 2022, 12p.

Ericcson, "MCG failure handling in case of NE-DC (TP to 37.340)", GP33 TSG-RAN WG2 Meeting #AH1807, R2-1809949 (resubmission of R2-1807079), dated Jul. 6, 2018, 5p, CA.

Ericcson, "RLM and RLF in case of LTE-NR tight interworking", 3GPP TSG-RAN WG2 meeting #97, R2-1700918, Feb. 17, 2017, 3p, GR.

Catt, "UE Behaviors after CG failure in case of NE-DC", 3GPP TSG-RAN WG2 Meeting #103bis, R2-1813840 (resubmission of R2-1811227), Oct. 12, 2018, 2p, CN.

First Office Action and Search Report for corresponding application No. CN 202111395024.8 dated Oct. 31, 2022, 8p, in Chinese language.

English language translation of First Office Action for corresponding application No. CN 202111395024.8 dated Oct. 31, 2022, 5p.

Ericsson, "MCG failure handling in case of NE-DC and NN-DC (TP to 37.340)", 3GPP TSG-RAN WG2 meeting #103, R2-1812017 (revision of R1809949), Aug. 24, 2018, 6p, SW.

Second Office Action and Search Report for corresponding application No. CN 202111395024.8 dated May 10, 2023, 7p, in Chinese language.

English language translation of Second Office Action for corresponding application No. CN 202111395024.8 dated May 10, 2023, 4p.

Search report for corresponding application No. SG11202107924U dated Aug. 5, 2023, 3p.

Written Opinion for corresponding application No. SG11202107924U dated Aug. 8, 2023, 9p.

Office Action for Korean application No. 9-5-2024-031812445 dated Apr. 16, 2024, 6p, in Korean language.

English language translation for Office Action for Korean application No. 9-5-2024-031812445 dated Apr. 16, 2024, 3p.

Catt, "UE Behaviors after CG failure in case of NE-DC", 3GPP TSG-RAN WG2 Meeting #103, R2-1811227 (resubmission of R2-1809534), Aug. 24, 2018, 2p, SW.

\* cited by examiner

METHOD AND APPARATUS FOR REPORTING MASTER CELL GROUP FAILURE

RELATED APPLICATIONS

This application is a continuation of U.S. patent application Ser. No. 17/383,135, filed on Jul. 22, 2021, which is a continuation of International Application No. PCT/CN2019/073186, filed on Jan. 25, 2019. The entireties of the above application are hereby incorporated by reference.

TECHNICAL FIELD

This disclosure relates generally to wireless communications and, more particularly, to a method and apparatus for reporting a master cell group (MCG) failure and/or a Primary Cell (PCell) failure when the MCG failure and/or the PCell failure is detected by a wireless communication device so as to improve reliability and reduce service interruption in Multi-Radio Access technology Dual Connectivity (MR-DC).

BACKGROUND

With a continuous increasing of global smartphone users, mobile data usage and traffic will continue to grow. In New Radio, Dual Connectivity (DC) are proposed to allow a wireless communication device with multiple transceivers to simultaneously receive data packet from at least two wireless communication nodes, for example a Master gNodeB (MgNB or MN) and a secondary gNodeB (SgNB or SN). The wireless communication device can connect with a Master Cell Group (MCG) associated with the MN and a Secondary Cell Group (SCG) associated with the SN simultaneously so as to improve data rate, reduce latency, and improve reliability.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

A MCG failure and/or a PCell failure, hereinafter a MCG failure in the present disclosure, can be caused by a radio link failure (RLF), a re-configuration with a synchronization failure, a mobility from NR or E-UTRA failure, an integrity check failure concerning a Signaling Radio Bearer (SRB1 or SRB2), and a Radio Resource Control (RRC) connection reconfiguration failure. When a MCG failure is detected, the wireless communication device (UE) initiates a RRC re-establishment procedure. Such procedure introduces a service interruption since the UE suspends all resource blocks (RBs) and performs a cell re-selection procedure. However, when a MCG failure is detected by the UE, a SCG may still maintain a good link condition, and a split SRB and/or SRB3 may also be configured and activated for the UE. Therefore, there exists a need to develop a method and apparatus for reporting a MCG failure via split SRB and/or SRB3 after suspending MCG transmissions for a MCG reconfiguration to reduce service interruption caused by the RRC re-establishment procedure.

In one embodiment, a method for reporting a Master Cell Group (MCG) failure by a wireless communication device, includes: detecting a first MCG failure; and reporting the first MCG failure to a first wireless communication node, according to at least one of the following: a first indicator, a first failure type of the first MCG failure, a status of a Secondary Cell Group (SCG), and a Signal Radio Bearer (SRB) configuration.

In a further embodiment, a method for performing a Master Cell Group (MCG) reconfiguration by a first wireless communication node, includes: receiving a MCG failure report of a first MCG failure from a wireless communication device, according to at least one of the following: a first indicator, a first failure type of the first MCG failure, a status of a Secondary Cell Group (SCG), and a Signal Radio Bearer (SRB) configuration; and determining the MCG reconfiguration according to the MCG failure report.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
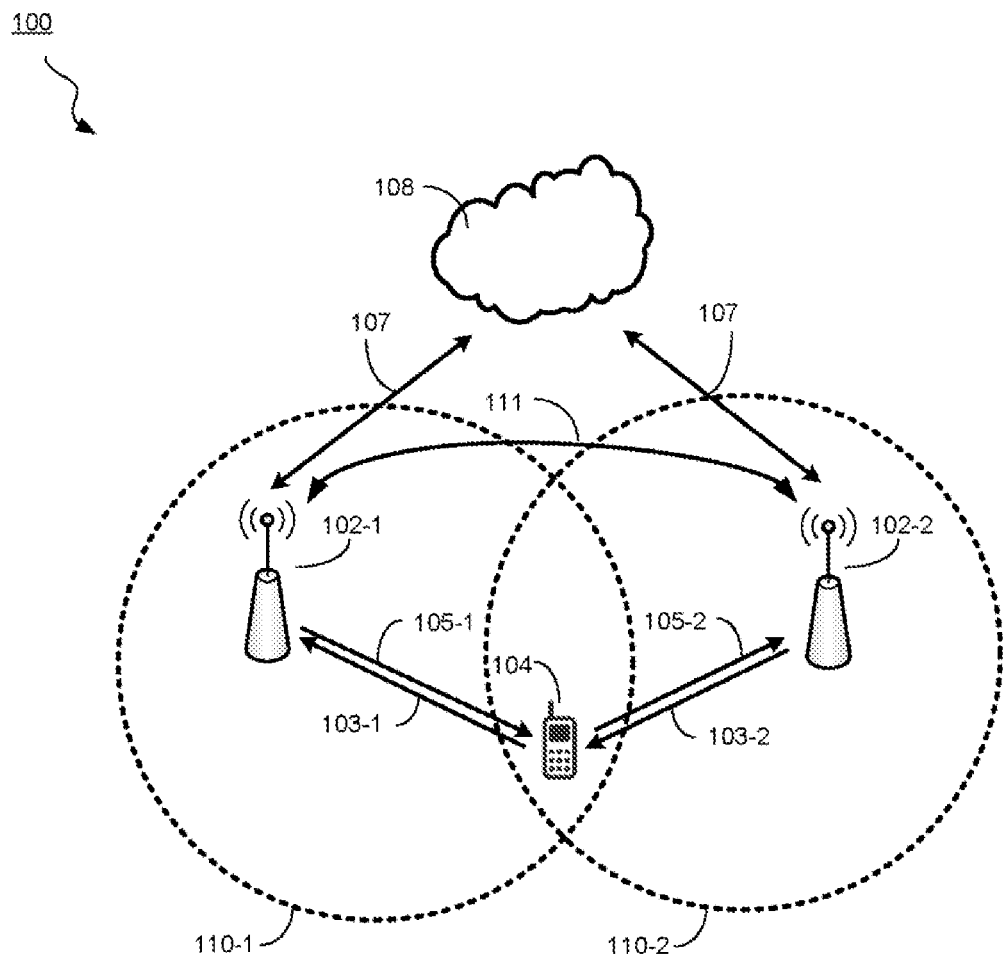
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BS s 102 and UEs 104, while remaining within the scope of the present disclosure.

Referring to FIG. 1A, the wireless communication network 100 includes a first BS 102-1, a second BS 102-2, and a UE 104. In some embodiments, the UE 104 forms direct communication (i.e., uplink) channels 103-1 and 103-2 with the first BS 102-1 and the second BS 102-2, respectively. In some embodiments, the UE 104 also forms direct communication (i.e., downlink) channels 105-1 and 105-2 with the first BS 102-1 and the second BS 102-2, respectively. The direct communication channels between the UE 104 and the BS 102 can be through interfaces such as an Uu interface, which is also known as E-UTRA/NR air interface. In some embodiments, the UE 104 comprises a plurality of transceivers which enables the UE 104 to support carrier aggregation (CA). In some embodiments, the UE 104 comprises a plurality of transceivers which enables the UE 104 to support dual connectivity so as to receive data simultaneously from the first BS 102-1 and the second BS 102-2. The first and second BS 102-1 and 102-2 each is connected to a core network (CN) 108 through an external interface 107, e.g., an Iu interface, or an NG interface. In some other embodiment, the first BS 102-1 (gNB) is a Master Node (MN), which is connected to the CN 108 and the second BS 102-2 (gNB) is a Secondary Node (SN), which is also connected to the CN 108.

In some other embodiments, when the first BS 102-1 and the second BS 102-2 each is a gNB, the direct communication between the first BS 102-1 and the second BS 102-2 is through an Xn interface. The first BS 102-1 and the second BS 102-2 are neighboring BSs. A first serving cell 110-1 is covered by the first BS 102-1 and the second serving cell 110-2 is covered by the second BS 102-2. In some embodiments, the first cell 110-1 is a primary cell of the MN, known as PCell, and the second cell 110-2 is a primary cell of the SN, known as PSCell. In some embodiments, the first cell 110-1 and the second cell 110-2 are neighboring cells.

Figure 1B:
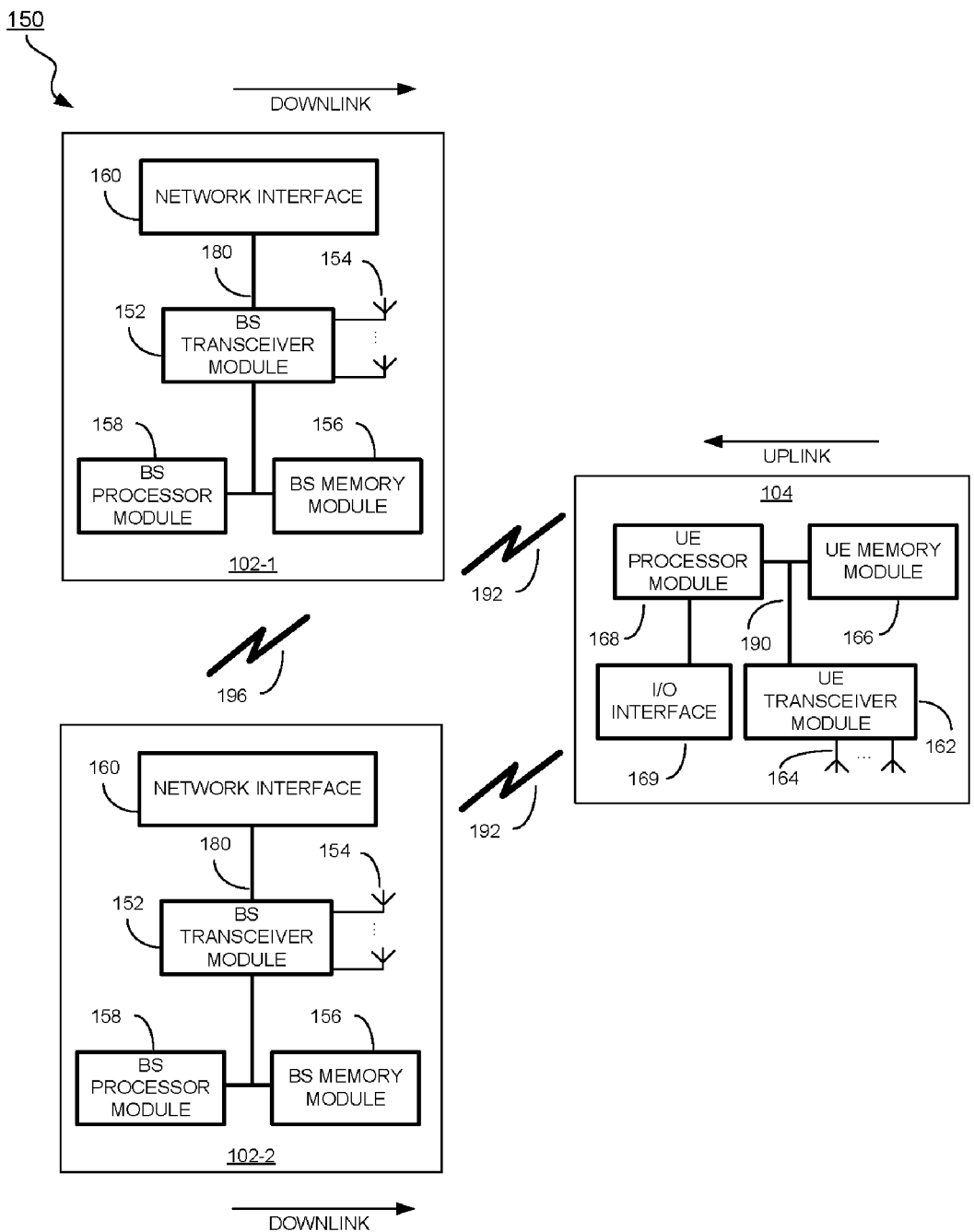
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown)

may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BS s.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BS s or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells (e.g., 110-1 for the first BS 102-1 and 110-2 for the second BS 102-2) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
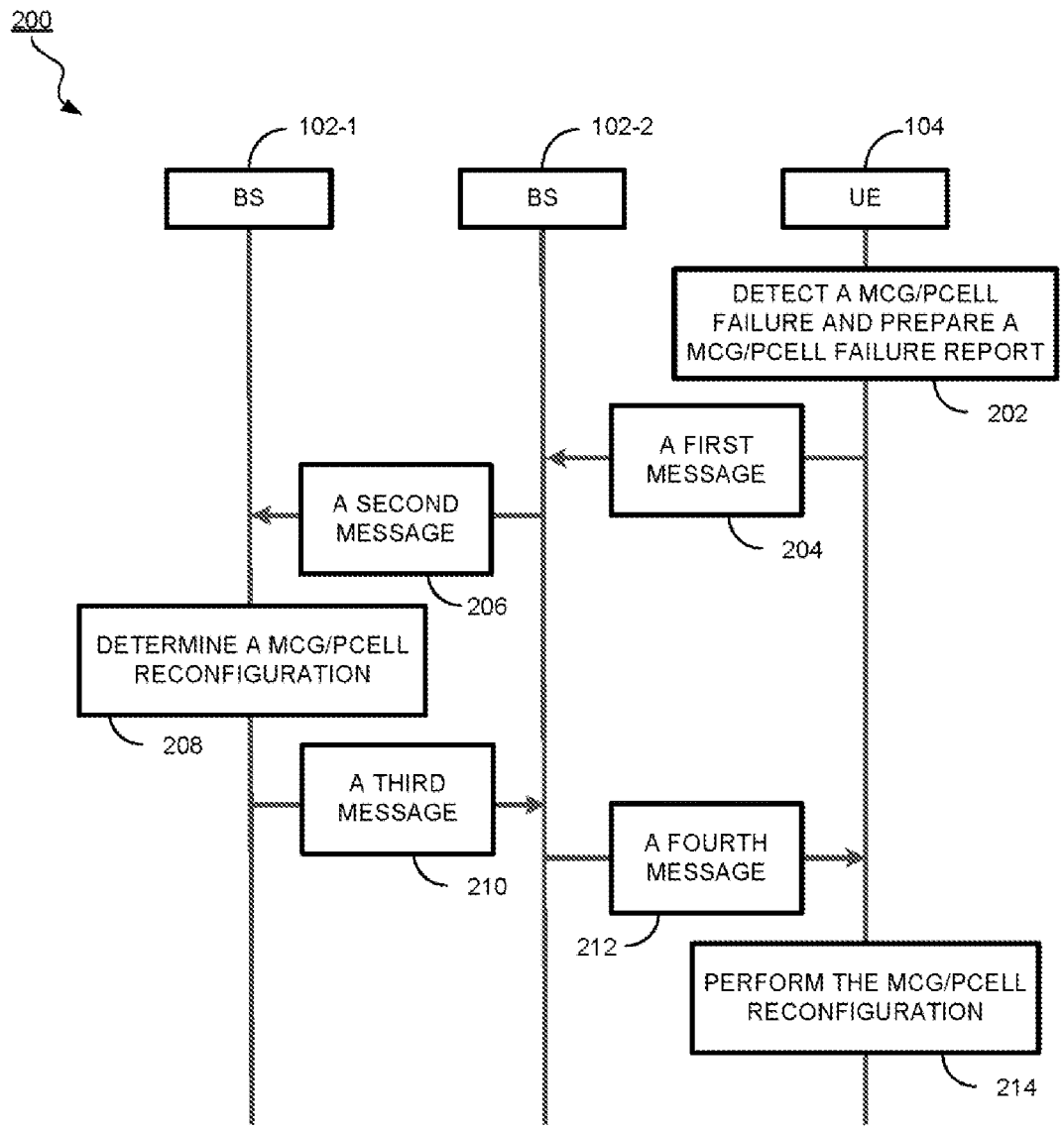
FIG. 2 illustrates a method for reporting a master cell group failure, in accordance with some embodiments of the present disclosure.

FIG. 2 illustrates a method 200 for reporting a master cell group (MCG) failure, in accordance with some embodiments of the present disclosure. It is understood that additional operations may be provided before, during, and after the method 200 of FIG. 2, and that some operations may be omitted or reordered. The communication system in the illustrated embodiment comprises a first BS 102-1, a second BS 102-2, and a UE 104. In the illustrated embodiments, the UE 104 is in one of at least one serving cell covered by the first BS 102-1 and the UE 104 is also in one of at least one serving cell covered by the second BS 102-2, i.e., the UE 104 is in connection with the first BS 102-1 and the second BS 102-2. In some embodiments, the first BS 102-1 is a primary wireless communication node (i.e., MN) and the second BS 102-2 is a secondary wireless communication node (i.e., SN). In some embodiments, the first BS 102-1 and the second BS 102-2 are target nodes that the UE 104 switches to during a MCG failure report procedure. The at least one serving cell within a MN are grouped together to form a Master Cell Group (MCG), and the at least one serving cell within a SN are grouped together to form a Secondary Cell Group (SCG). It should be noted that any numbers of BS 102 can be used and are within the scope of this invention.

The method 200 starts with operation 202 in which the UE 104 detects a MCG failure and determine a first procedure according to some embodiments. In some embodiments, the UE 104 detects the MCG failure on the at least one serving cell of the first BS 102-1 (MN). In some embodiments, the UE 104 detects the MCG failure on a lower layer, e.g. a Media Access Control (MAC) layer, or a Radio Link Control (RLC) layer of the MCG. In some embodiments, the first procedure is one of the following: a MCG failure reporting procedure and a RRC re-establishment procedure.

In some embodiments, the MCG failure reporting procedure is determined by the UE 104 when an indication is received by the UE 104 from one of the following: the first BS 102-1 and the second BS 102-2. In some embodiments, the indication is received from the first BS 102-1 in a RRC message. In some embodiments, the RRC message is a RRC reconfiguration message. In some embodiments, the indication in the RRC message received by the UE 104 is configured to indicate one of the following: whether the UE 104 is allowed to perform a MCG failure reporting procedure, whether the MCG failure reporting procedure is supported by one of the following: the first BS 102-1 and the second BS 102-2, whether the UE 104 is allowed to perform a MCG failure report procedure through SRB3, and whether the UE 104 is allowed to perform a failure report procedure through split SRB (i.e., split SRB1 and/or split SRB2). In some embodiments, the RRC message is received when the MCG is configured.

In some embodiments, the MCG failure reporting procedure is determined according to a first failure type, i.e., a reason of the MCG failure. In some embodiments, the first failure type that triggers the MCG failure report procedure comprises at least one of the following: a MCG RLF, a MCG RRC integrity check failure, a mobility from NR or E-TURA failure, a PCell handover failure, and a MN RRC reconfiguration failure without a SN configuration contained. In some embodiments, the MCG RLF is one of the following: a T310 expiration in the PCell, a random access problem indication from a MCG MAC layer, and an exceeded maximum number of re-transmissions in a MAC RLC layer. In some embodiments, the MCG RRC integrity check failure is detected on SRB1/2. In some embodiments, the MN RRC reconfiguration failure without the SN configuration contained can be determined by the UE 104 in E-UTRAN New Radio-Dual Connectivity (EN-DC), when an RRCConnectionReconfiguration-v1510-IEs field is absent in an RRCConnectionReconfiguration Message in a Long-Term Evolution (LTE) system.

In some embodiments, the MCG failure reporting procedure is not triggered and the RRC re-establishment procedure is triggered, when a second failure type is detected. In some embodiments, the second failure type comprises a MN RRC reconfiguration failure with the SN configuration contained.

In some embodiments, the MCG failure reporting procedure is not triggered according to a SCG status. For example, when there is an on-going SCG failure reporting procedure after a SCG failure is detected by the UE 104, including at least one of the following: a SCG RLF, a SN change failure, a SCG configuration failure on SRB3, and SCG RRC integrity check failure on SRB3, the first message comprising the MCG failure report is not triggered by the UE 104. For another example, when an uplink transmission between the UE 104 and the second BS 102-2 is suspended, the MCG failure reporting procedure is not triggered by the UE 104. For another example, when the SCG is not available, the MCG failure reporting procedure is not triggered by the UE 104.

In some embodiments, the MCG failure reporting procedure is not triggered and the RRC re-establishment procedure is triggered according to a SRB configuration, wherein the SRB configuration comprises at least one of the following: when split SRB is not configured for the SRB1 and/or SRB2, and when the SRB3 is not configured.

In some embodiments, the MCG failure reporting procedure is not triggered and the RRC re-establishment procedure is triggered according an on-going procedure of at least one of the following: a SCG failure reporting procedure, a SCG change procedure, a PSCell change procedure, a PCell change procedure, and a Random Access (RA) procedure on the PSCell.

For example, when a MCG failure is detected by the UE 104, when the indication transmitted from the first BS 102-1 to the UE 104 indicates a MCG failure reporting procedure by the UE 104 is allowed and supported by the first BS 102-1, and when a SCG is available, the UE 104 determines a MCG failure reporting procedure (e.g., transmits the failure report to the first BS 102-1 via split SRB, or transmits the failure report to the second BS 102-2 via SRB3 and then transferring to the first BS 102-2) or a RRC re-establishment procedure according to the MCG failure type. Specifically, when the MCG failure type is one of the first failure types, the UE 104 transmits the first message comprising the MCG failure report.

In some embodiments, when the MCG failure reporting procedure is triggered, at least one of the following actions can be performed by the UE 104 in operation 202: suspending all uplink (UL) and/or downlink (DL) transmission in the MCG, suspending all UL and/or DL transmission in the PCell, terminating a first timer, terminating a second timer, starting a third timer and resetting the MCG MAC. In some embodiments, the first timer (e.g., T310) is configured for RL monitoring and beam failure detection. In some embodiments, the second timer (e.g., T304) is configured for RA problem detection. In some embodiments, the third timer is configured for MCG failure reporting procedure.

In some embodiments, a third timer is started when the MCG failure reporting procedure is triggered. In some embodiments, the third timer is started when the MCG failure report is transmitted from the RRC layer to lower layers or is successfully transmitted to the second BS 102-2 through the lower layers. In some embodiments, a length of the third timer is configured by one of the following: system information and a dedicated RRC message.

The method 200 continues with operation 204 in which a first message is transmitted from the UE 104 to the second BS 102-2 according to some embodiments. In some embodiments, the first message is transmitted by the UE 104 to the second BS 102-1 after a failure report procedure is determined by the UE 104. In some embodiments, the first message is transmitted by the UE 104 to the lower layer of second BS 102-1 (e.g., a SN RLC layer). In some embodiments, the first message comprises a MCG failure report. In some embodiments, the UE 104 prepares the MCG failure report after the operation 202 in which the MCG failure is detected by the UE 104. In some embodiments, the MCG failure report procedure is performed on radio resources configured for the SCG.

In some embodiments, when the first message comprising the MCG failure report is transmitted from the UE 104 to the second BS 102-2 through one of the following: the SCG leg of the split SRB (e.g., split SRB1 and/or split SRB2). In some embodiments, the MCG failure report is encapsulated in a RLC Service Data Unit (SDU). In some embodiments, when the first message comprising the MCG failure report is transmitted from the UE 104 to the second BS 102-1 through the SRB3, the first message is a SN RRC message. In some embodiments, the MCG failure report is encapsulated in at least one of the following: at least one RRC container, and at least one explicit information element (IE). In some embodiments, the at least one RRC container each is one of the following: a bit string and an octet string. In some embodiments, the MCG failure report in the at least one RRC container each is one of the following: a RRC Protocol Data Unit (PDU), and a Packet Data Convergence Protocol (PDCP) PDU. In some embodiments, when a PDCP PDU is used to carry the MCG failure report, the PDCP PDU is ciphered or integrity protected by a security context used for the split SRB1 or the split SRB2. In some embodiments, when the first message comprising the MCG failure report is transmitted from the UE 104 to the second BS 102-2 through the SRB3, the first message is one of the following: a newly-defined message or a new IE in an existing message.

In some embodiments, when both the split SRB (i.e., split SRB1 or split SRB2) and the SRB3 are configured, the SRB (e.g., split SRB or SRB3) carrying the first message is determined by the UE 104 according to one of the following: a priority of the SRB, and an indicator. In some embodiments, the split SRB (e.g., split SRB1 or split SRB2) has a higher priority than the SRB3. In some embodiments, the priority of the SRB can be configured by the first BS 102-1 through a dedicated RRC message. In some embodiments, at least one SRB can be configured by the first BS 102-1 as a SRB used or allowed to be used for transmitting the MCG failure report. For example, when the split SRB (e.g., split SRB1 or split SRB2) is configured as the SRB for transmitting the MCG failure report, the UE 104 selects the split SRB (e.g., split SRB1 or split SRB2) for transmitting the first message. For another example, when both the split SRB and SRB3 are allowed to be used for transmitting the MCG failure report, the UE 104 determines a SRB according to its priority. In some embodiments, both the split SRB and SRB3 can be used for transmitting the MCG failure report.

In some embodiments, the MCG failure report further comprises at least one of the following: an indicator, a RLF report, the first failure type, measurement results of at least one serving cell, and measurement results of at least one neighboring cells of one of the following: the first BS 102-1 and the second BS 102-2. In some embodiments, the indicator is configured to indicate whether the RLF report is stored in the UE 104. In some embodiments, when the indicator is contained in the first message, the first BS 102-1 or/and the second BS 102-2 can retrieve the RLF report stored in the UE 104 via a UE information request procedure. In some embodiments, a RLF report (e.g., a RLF report defined in LTE or containing similar information) comprises at least one of the following: a cause of the RLF, a cell identity, a PLMN list, measurement results of at least one serving cell, and measurement results of at least one neighboring cells. In some embodiments, the first failure type comprises at least one of the following: a PCell handover failure, a MN RRC reconfiguration failure without the SN configuration contained, a MCG T310 expiration, a PCell random access problem, an exceeded maximum number of retransmission, and a MCG RRC integrity protection (IP) failure. In some embodiments, the measurement results of at least one serving cell and the measurement results of at least one neighboring cell each comprises one of the following: Physical Cell ID (PCI), Reference Signal Received Power (RSRP), Reference Signal Received Quality (RSRQ), and Signal-to-Interference plus Noise Ratio (SINR).

In some embodiments, the second BS 102-2 is a target SN when the MCG failure occurs in a PCell/MN handover procedure with a SN change. In some embodiments, the second BS 102-2 (target SN) receives context of the UE 104 stored on the source SN from the first BS 102-1. In some embodiments, a connection between the first BS 102-1 and the source SN is released, when the first BS 102-1 received a SN Release Request Acknowledge message from the source SN, and the context of the UE 104 stored on the source SN is also released after a path update procedure between the first BS 102-1 and the CN 108 has been completed.

The method 200 continues with operation 206 in which a second message is transmitted from the second BS 102-2 to the first BS 102-1 according to some embodiments. In some embodiments, the second message is transmitted from the lower layer of the second BS 102-2 (e.g. a SN RLC layer) to the higher layer of the first BS 102-1 (e.g. a MN PDCP layer). In some embodiments, the second message is an inter-node RRC message. In some embodiments, the second message is transmitted through the X2/Xn interface. In some embodiments, the second message is a MNFailureReport message. In some embodiments, the second message comprises the MCG failure report in the first message received by the second BS 102-2 from the UE 104. In some embodiments, the MCG failure report is one of the following: encapsulated in at least one of the following: at least one RRC container, and at least one explicit information element (IE). In some embodiments, the at least one RRC container each is one of the following: a bit string and an octet string. In some embodiments, the MCG failure report in the at least one RRC container each is one of the following: a RRC Protocol Data Unit (PDU), and a Packet Data Convergence Protocol (PDCP) PDU. In some embodiments, when a PDCP PDU is used to carry the second message, the PDCP PDU is ciphered or integrity protected by a security context used for the SRB1 or SRB2. In some embodiments, the MCG failure report is one of the following: a newly-defined message or a new IE in an existing message.

In some other embodiments, the second message is transmitted through the SCG leg of the split SRB (e.g., split SRB1 or split SRB2). In some embodiments, the first BS 102-1 is a target MN when the MCG failure occurs in one of the following: an inter-PCell/MN handover procedure with a SN change and an inter-PCell/MN handover procedure with no SN change. In some embodiments, the first BS 102-1 is a source MN when the MCG failure occurs in an intra-PCell/MN handover procedure with a SN change. In some embodiments, the context of the UE 104 is transmitted to the first BS 102-1 (target MN) from the source MN.

The method 200 continues with operation 208 in which the first BS 102-1 determines a MCG reconfiguration according to some embodiments. In some embodiments, the MCG reconfiguration comprises one of the following: maintaining the first BS 102-1, change configurations of the MCG and/or PCell, change the first BS 102-1 (i.e., change from a source MN to a target MN), and release the first BS 102-1. In some embodiments, the MCG reconfiguration is determined by the first BS 102-1 according to the MCG failure report.

The method 200 continues with operation 210 in which a third message is received by the second BS 102-2 from the first BS 102-1 according to some embodiments. In some embodiments, the third message is received by the lower layer of the second BS 102-2 (e.g., a SN RLC layer) from the higher layer of the first BS 102-1 (e.g., a MN PDCP layer). In some embodiments, the third message is an inter-node RRC message. In some embodiments, the third message is a MNFailureReportAcknowledge message. In some embodiments, the third message is transmitted through the X2/Xn interface. In some embodiments, the third message comprises MCG reconfiguration information. In some embodiments, the MCG reconfiguration information is encapsulated in at least one of the following: at least one RRC container, and at least one explicit information element (IE). In some embodiments, at least one RRC container each is one of the following: a bit string and an octet string. In some embodiments, the MCG reconfiguration information in the at least one RRC container each is one of the following: a RRC Protocol Data Unit (PDU), and a Packet Data Convergence Protocol (PDCP) PDU. In some embodiments, when a PDCP PDU is used to carry the third message, the PDCP PDU is ciphered or integrity protected by a security context used for the SRB1 or SRB2. In some embodiments, the third message is one of the following: a newly-defined message or a new IE in an existing message. In some other embodiments, the third message is transmitted through the SCG leg of the split SRB (e.g., split SRB1 or split SRB2).

The method 200 continues with operation 212 in which a fourth message is transmitted from the second BS 102-2 to the UE 104 according to some embodiments. In some embodiments, the fourth message is transmitted from the lower layer of the second BS 102-2 (e.g., the SN RLC layer) to the UE 104. In some embodiments, the fourth message is a RRC reconfiguration message. In some embodiments, the fourth message comprises the MCG reconfiguration information received in the third message from the first BS 102-1. In some embodiments, when the fourth message comprising the MCG reconfiguration information is transmitted from the second BS 102-2 to the UE 104 through one of the following: the SCG leg of the split SRB (e.g., split SRB1 and/or split SRB2). In some embodiments, the MCG reconfiguration information is encapsulated in a RLC SDU. In some embodiments, when the first message comprising the MCG reconfiguration information is transmitted from the UE 104 to the second BS 102-2 through the SRB3, the fourth message is a SN RRC message. In some embodiments, the MCG reconfiguration information is encapsulated in at least one of the following: at least one RRC container, and at least one explicit information element (IE). In some embodiments, the at least one RRC container each is one of the following: a bit string and an octet string. In some embodiments, the MCG reconfiguration information in the at least one RRC container each is one of the following: a RRC Protocol Data Unit (PDU), and a Packet Data Convergence Protocol (PDCP) PDU. In some embodiments, when a PDCP PDU is used to carry the fourth message, the PDCP PDU is ciphered or integrity protected by a security context used for the SRB1 or SRB2. In some embodiments, fourth message is one of the following: a newly-defined message or a new IE in an existing message. In some embodiments, the fourth message is one of the following: a MCG reconfiguration message, a MCG re-establishment message, and a MCG resume message. In some embodiments, when the first message is transmitted through the SRB3, the fourth message is transmitted through the SRB3. In some embodiments, when the first message is received from the UE 104 through the SCG leg of the split SRB (e.g., split SRB1 or SRB2) by the first BS 102-1, the fourth message is transmitted through the SCG leg of the split SRB (e.g., SRB1 or SRB2) from the first BS 102-1 to the UE 104.

The method 200 continues with operation 214 in which a MCG reconfiguration procedure is performed by the UE 104 according to some embodiments. In some embodiments, the third timer is terminated after the fourth message is received. In some embodiments, the MCG and/or PCell reconfiguration procedure is performed by the UE 104 according to the MCG reconfiguration received in the fourth message.

In some embodiments, during the MCG failure reporting procedure, the RRC re-establishment procedure is triggered, when at least one of the following occurs: a transmission of the MCG failure report from the RRC layer to the lower layers is failed, the UE 104 fails to perform the instructions received in the fourth message (e.g., a MN/PCell RRC reconfiguration failure, or a hand-over failure), a second RLF is detected in the same PCell. In some embodiments, when the second RLF is detected in the same PCell and reported in a second MCG failure report, the first BS 102-1 or the second BS 102-2 can determine if the RRC re-establishment procedure is performed by the UE. In some embodiments, the RRC re-establishment procedure is triggered according to the on-going cell procedure. For example, during the MCG failure reporting procedure, when a SCG failure is detected, the RRC re-establishment procedure is triggered.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein.

Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for reporting a Master Cell Group (MCG) failure by a wireless communication device, comprising:
    detecting a first MCG failure;
    reporting the first MCG failure to a first wireless communication node, via a second wireless communication node, according to a first indicator, a first failure type of the first MCG failure, a status of a Secondary Cell Group (SCG), and a Signal Radio Bearer (SRB) configuration, wherein the first indicator is configured to indicate whether the wireless communication device is allowed to report the first MCG failure; and
    receiving an MCG message, by the wireless communication device from a second wireless communication node, the MCG message including at least one of: an MCG reconfiguration message, an MCG re-establishment message, or an MCG resume message.

2. The method of claim 1, wherein the first failure type comprises an MCG Radio Link Failure (RLF).

3. The method of claim 1, wherein reporting the first MCG failure to the first wireless communication node comprises:

transmitting a first message to the second wireless communication node;
transmitting a second message to the first wireless communication node from the second wireless communication node;
determining an MCG reconfiguration by the first wireless communication node; and
receiving a third message by the second wireless communication node from the first wireless communication node,
wherein the first message and the second message each comprises information of an MCG failure report, and wherein the third message and the MCG message each comprises information of the MCG reconfiguration.

4. The method of claim 1, wherein the first MCG failure is reported through one of the following: an SRB3 or an SCG leg of a split SRB1.

5. The method of claim 1, wherein reporting the first MCG failure to the first wireless communication node comprises transmitting an MCG failure report to the second wireless communication node, and the MCG failure report comprises at least one of the following: the first failure type, measurement results of at least one serving cell, or measurement results of at least one neighboring cell.

6. The method of claim 1, wherein the MCG message is transmitted through an SRB3 or an SCG leg of a split SRB1.

7. The method of claim 3, wherein an MCG failure report is encapsulated in at least one RRC container and wherein the MCG reconfiguration is encapsulated in at least one RRC container.

8. The method of claim 1, further comprising performing at least one of the following:
terminating a first timer; or
resetting an MCG MAC.

9. The method of claim 8, wherein the first timer is configured for RL monitoring and beam failure detection.

10. The method of claim 1, further comprising performing an RRC re-establishment, in response to at least one of the following conditions is met:
when a SCG is not available;
when an on-going procedure, comprising a primary secondary cell (PSCell) change procedure, is performed; or
when a second timer is expired.

11. A method for performing a Master Cell Group (MCG) reconfiguration by a first wireless communication node, comprising:
receiving an MCG failure report of a first MCG failure reported from a wireless communication device, via a second wireless communication node, according to a first indicator, a first failure type of the first MCG failure, a status of a Secondary Cell Group (SCG), and a Signal Radio Bearer (SRB) configuration, wherein the first indicator is configured to indicate whether the wireless communication device is allowed to report the first MCG failure;
determining the MCG reconfiguration according to the MCG failure report; and
transmitting, to the second wireless communication node, a third message, which corresponds to an MCG message from the second wireless communication node to the wireless communication device, the third message and the MCG message each comprising information of the MCG reconfiguration.

12. The method of claim 11, wherein the first failure type comprises an MCG Radio Link Failure (RLF).

13. The method of claim 11, wherein the MCG failure report is transmitted through one of the following: an SRB3 or an SCG leg of a split SRB1.

14. The method of claim 1, further comprising starting a second timer when an MCG failure report is transmitted and stopping the second timer in response to the reception of the MCG message, wherein the second timer is configured for the MCG failure report.

15. A wireless communication device, comprising:
at least one processor; and
at least one memory coupled to the at least one processor, the at least one processor being configured to read code from the at least one memory to cause the wireless communication device to:
detect a first MCG failure;
report the first MCG failure to a first wireless communication node, via a second wireless communication node, according to a first indicator, a first failure type of the first MCG failure, a status of a Secondary Cell Group (SCG), and a Signal Radio Bearer (SRB) configuration, wherein the first indicator is configured to indicate whether the wireless communication device is allowed to report the first MCG failure; and
receive an MCG message by the wireless communication device from a second wireless communication node, the MCG message including at least one of: an MCG reconfiguration message, an MCG re-establishment message, or an MCG resume message.

16. The wireless communication device of claim 15, wherein the first failure type comprises an MCG Radio Link Failure (RLF).

17. The wireless communication device of claim 15, wherein the first MCG failure is reported through one of the following: an SRB3 or an SCG leg of a split SRB1.

18. The wireless communication device of claim 15, wherein the at least one processor is further configured to cause the wireless communication device to report the first MCG failure to the first wireless communication node by transmitting an MCG failure report to the second wireless communication node, and wherein the MCG failure report comprises at least one of the following: the first failure type, measurement results of at least one serving cell, or measurement results of at least one neighboring cell.

19. The wireless communication device of claim 15, wherein the at least one processor is further configured to:
terminate a first timer; or
reset an MCG MAC.

20. The wireless communication device of claim 19, wherein the first timer is configured for RL monitoring and beam failure detection.

21. The wireless communication device of claim 19, wherein the at least one processor is further configured to cause the wireless communication device to perform an RRC re-establishment in response to at least one of the following conditions is met:
when a SCG is not available;
when an on-going procedure, comprising a primary secondary cell (PSCell) change procedure, is performed; or
when a second timer is expired.

22. The wireless communication device of claim 15, wherein the at least one processor is further configured to cause the wireless communication device to start a second timer when an MCG failure report is transmitted and stop the second timer in response to the reception of the MCG message, wherein the second timer is configured for the MCG failure report.

23. A wireless communication node, comprising:
a transceiver, configured to:
- receive an MCG failure report of a first MCG failure, from a wireless communication device via a second wireless communication node, according to a first indicator, a first failure type of the first MCG failure, a status of a Secondary Cell Group (SCG), and a Signal Radio Bearer (SRB) configuration, wherein the first indicator is configured to indicate whether the wireless communication device is allowed to report the first MCG failure; and
- transmit, to the second wireless communication node, a third message, which corresponds to an MCG message from the second wireless communication node to the wireless communication device, the third message and the MCG message each comprising information of a Master Cell Group (MCG) reconfiguration; and a processor, electrically coupled to the transceiver and configured to determine the MCG reconfiguration according to the MCG failure report.

24. The wireless communication node of claim 23, wherein the first failure type comprises an MCG Radio Link Failure (RLF).

25. The wireless communication node of claim 24, wherein the MCG failure report is transmitted through one of the following: an SRB3 or an SCG leg of a split SRB1.

* * * * *